United States Patent
Korczak et al.

(10) Patent No.: US 9,837,185 B2
(45) Date of Patent: Dec. 5, 2017

(54) MOUNTING SYSTEMS FOR POWER, COMMUNICATION AND FIBER OPTIC CABLES

(71) Applicant: CommScope Technologies LLC, Hickory, NC (US)

(72) Inventors: Richard L. Korczak, Channahon, IL (US); John C. Chamberlain, Hickory, NC (US); Ronald A. Vaccaro, Shorewood, IL (US)

(73) Assignee: CommScope Technologies LLC, Hickory, NC (US)

( * ) Notice: Subject to any disclaimer, the term of this patent is extended or adjusted under 35 U.S.C. 154(b) by 488 days.

(21) Appl. No.: 14/322,114

(22) Filed: Jul. 2, 2014

(65) Prior Publication Data

US 2015/0010280 A1    Jan. 8, 2015

Related U.S. Application Data

(60) Provisional application No. 61/842,435, filed on Jul. 3, 2013, provisional application No. 61/860,579, filed on Jul. 31, 2013, provisional application No. 61/861,506, filed on Aug. 2, 2013, provisional application No. 61/865,265, filed on Aug. 13, 2013.

(51) Int. Cl.
| | |
|---|---|
| H02G 7/20 | (2006.01) |
| H02G 3/30 | (2006.01) |
| H01B 7/40 | (2006.01) |
| F16L 3/22 | (2006.01) |
| H02G 3/00 | (2006.01) |
| G02B 6/44 | (2006.01) |

(Continued)

(52) U.S. Cl.
CPC .............. *H01B 7/40* (2013.01); *G02B 6/4471* (2013.01); *H02G 3/26* (2013.01); *H02G 3/30* (2013.01); *F16L 3/2235* (2013.01); *G02B 6/483* (2013.01)

(58) Field of Classification Search
CPC ... H01B 7/40; H02G 3/26; H02G 3/30; G02B 6/4439; G02B 6/4471; G02B 6/483; F16L 3/2235
USPC ...... 248/68.1, 65, 67.7; 24/129 R, 339, 570; 174/45 R, 117 FF, 70 R, 84 C, 138 G; 385/100, 136
See application file for complete search history.

(56) References Cited

U.S. PATENT DOCUMENTS 4,817,910 A * 4/1989 Molnar .................... H04Q 1/06
                                                                  248/68.1
5,201,484 A * 4/1993 Thoen .................. F16L 3/2235
                                                                  248/68.1

(Continued)

FOREIGN PATENT DOCUMENTS

| JP | H07123562 | 5/1995 |
| JP | 2002247741 | 8/2002 |
| JP | 2004153926 | 5/2004 |

OTHER PUBLICATIONS

International Search Report and Written Opinion for corresponding PCT Application No. PCT/US201/045203, dated Oct. 28, 2014, 11 pages.

*Primary Examiner* — Tan Le
(74) *Attorney, Agent, or Firm* — Myers Bigel, P.A.

(57) ABSTRACT

An assembly includes: a foundation structure; first and second cables having a flattened profile; and a mounting member engaging the first and second cables such that the first and second cables are arranged in stacked relationship and are mounted to the foundation structure.

14 Claims, 12 Drawing Sheets

(51) Int. Cl.
*F16L 3/223* (2006.01)
*G02B 6/48* (2006.01)

(56) References Cited

U.S. PATENT DOCUMENTS

| | | | | |
|---|---|---|---|---|
| 5,463,189 A | * | 10/1995 | Deneke | H02G 3/26 |
| | | | | 174/138 G |
| 5,612,509 A | * | 3/1997 | Market | H02G 3/26 |
| | | | | 174/53 |
| 5,626,316 A | * | 5/1997 | Smigel | F16L 3/22 |
| | | | | 248/68.1 |
| 7,608,782 B2 | * | 10/2009 | Hill | H01R 4/48 |
| | | | | 174/84 C |
| 8,695,688 B2 | * | 4/2014 | Schneider | F28D 7/06 |
| | | | | 122/510 |
| 9,411,117 B1 | * | 8/2016 | Goodsell | G02B 6/4439 |
| 2012/0217058 A1 | | 8/2012 | Higby | |
| 2012/0285740 A1 | | 11/2012 | Haley et al. | |
| 2014/0027153 A1 | | 1/2014 | Harwath | |

\* cited by examiner

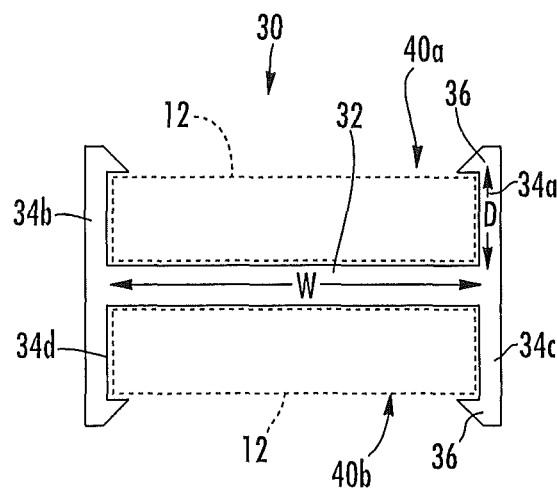
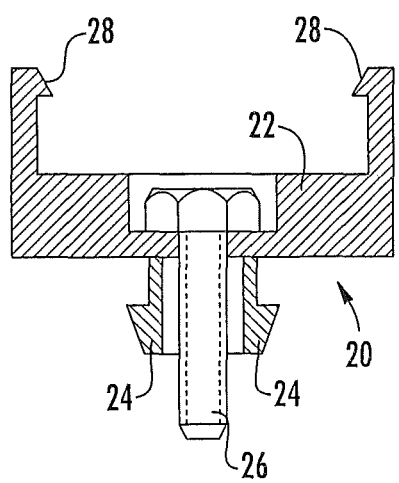
FIG. 3  FIG. 4
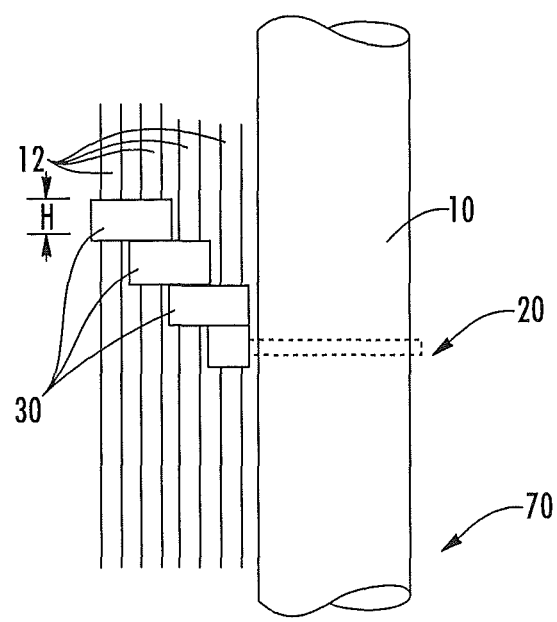
FIG. 5

MOUNTING SYSTEMS FOR POWER, COMMUNICATION AND FIBER OPTIC CABLES

RELATED APPLICATIONS

The present invention claims priority to and the benefit of U.S. Provisional Patent Application No. 61/842,435 (filed Jul. 3, 2013), 61/860,579 (filed Jul. 31, 2013), 61/861,506 (filed Aug. 2, 2013), and 61/865,265 (filed Aug. 13, 2013), the disclosure of each of which is hereby incorporated herein in its entirety.

FIELD OF THE INVENTION

The present invention relates generally to cables, and more particularly to the mounting of cables.

BACKGROUND

Radio frequency (RF) transceivers have traditionally been located on the ground, with RF signals transmitted to and received from antennas mounted atop radio towers interconnected with the RF transceivers by RF coaxial cables. A move toward remote radio head (RRH) installations, wherein the RF transceivers are themselves located atop radio towers proximate the antennas, has reduced the need for RF coaxial cables to transmit the RF signals between the transceiver and the antenna, but has also increased the demand for electrical power at the top of the radio tower.

Traditional electrical power cables comprise large gauge copper conductors with a circular cross-section. However, such power cables are heavy, difficult to bend and have a high material cost directly related to the rising cost of copper metal.

Cost and weight efficient aluminum power cables are known. However, to deliver the same current capacity as a copper cable, an aluminum power cable requires an increased cross-sectional area. Also, a differential in the thermal expansion coefficient of aluminum material cables and that of the various metals comprising connections/connectors can cause electrical interconnection reliability issues, which tend to increase as the diameter of the clamped portion of the aluminum conductor increases. Moreover, as the diameter of a power cable increases with increasing power capacity, the bend radius of the power cable increases, which makes the cable more difficult to handle and to route.

One proposed solution is offered in U.S. Patent Publication No. 2014/0027153 to Harwath, the disclosure of which is hereby incorporated herein in its entirety. This document discusses a power cable that has a flattened, rather than round, profile, which can reduce weight and bend radius. However, this flattened profile also raises other issues, such as mounting, that need to be addressed.

SUMMARY

As a first aspect, embodiments of the invention are directed to an assembly, comprising: a foundation structure; first and second cables having a flattened profile; and a mounting member engaging the first and second cables such that the first and second cables are arranged in stacked relationship and are mounted to the foundation structure.

In some embodiments, the mounting member comprises a mounting bracket having first and second receiving compartments, the first cable received in the first receiving compartment and the second cable received in the second receiving compartment. Such an arrangement can enable the cables to be arranged in a stacked configuration.

In other embodiments, the mounting member comprises a relatively narrow central portion and first and second end portions mounted on respective opposed ends of the central portion. Each of the first and second end portions includes front and rear opposed faces. Each of the front face of the first end portion and the rear face of the first end portion has a first mounting feature, and each of the rear face of the second end portion and the front face of the second end portion has a second mounting feature configured to mate with the first mounting feature.

As a second aspect, embodiments of the invention are directed to a cable. configured for stackable mounting. The cable comprises: a core of a plurality of elongate members; and a unitary jacket surrounding the core, the jacket comprising a main body within which the core resides and mounting features thereon. The mounting features are configured to mount to a second cable of substantially identical cross-section.

In some embodiments, an assembly can be formed comprising a foundation and first and second cables as described above. The first cable is mounted to the foundation, and the second cable is mounted to the first cable in stacked relationship via the mounting features.

As a third aspect, embodiments of the invention are directed to a power cable assembly suitable for mounting to a tower with a hoisting grip, comprising: a power cable having a flattened profile; and two semicircular spacers positioned on opposed surfaces of the power cable.

BRIEF DESCRIPTION OF THE FIGURES

FIG. 3 is a top view of an exemplary mounting bracket with two flat communications cables shown in broken line according to embodiments of the invention.

FIG. 4 is a top view of an adapter for mounting the mounting brackets shown in FIG. 3.

FIG. 5 is a side view of a plurality of flat power cables mounting to an antenna pole via stackable mounting brackets of FIG. 3 and an adapter of FIG. 4 according to embodiments of the present invention.

DETAILED DESCRIPTION OF EMBODIMENTS OF THE INVENTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
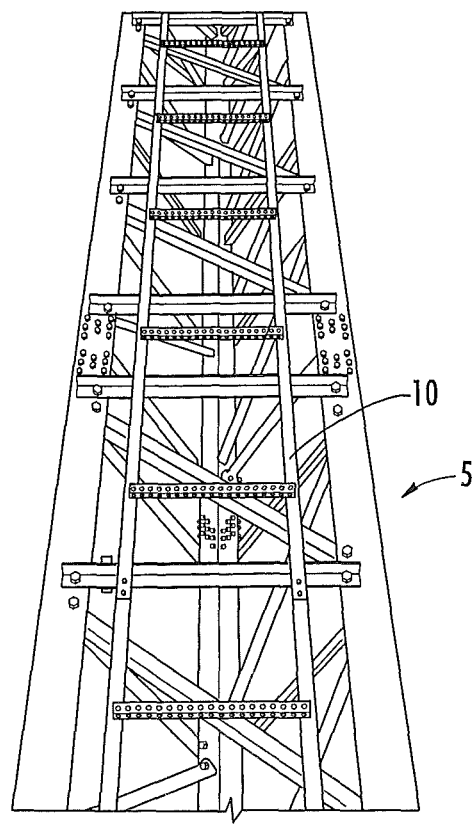
FIG. 1 is a front view of a portion of an antenna tower.

Referring now to the figures, an antenna tower, designated at 5, is shown in FIG. 1. The antenna tower 5 may be of conventional construction known to those of skill in this art and need not be described in detail herein. As shown in FIG. 1, the tower 5 may have a ladder 10 that may serve as a mounting location for cables that are routed to the top of the tower. In some embodiments, other components of the tower 5 may serve as a foundation structure for mounting cables that are routed to the top of the tower.

Figure 2:
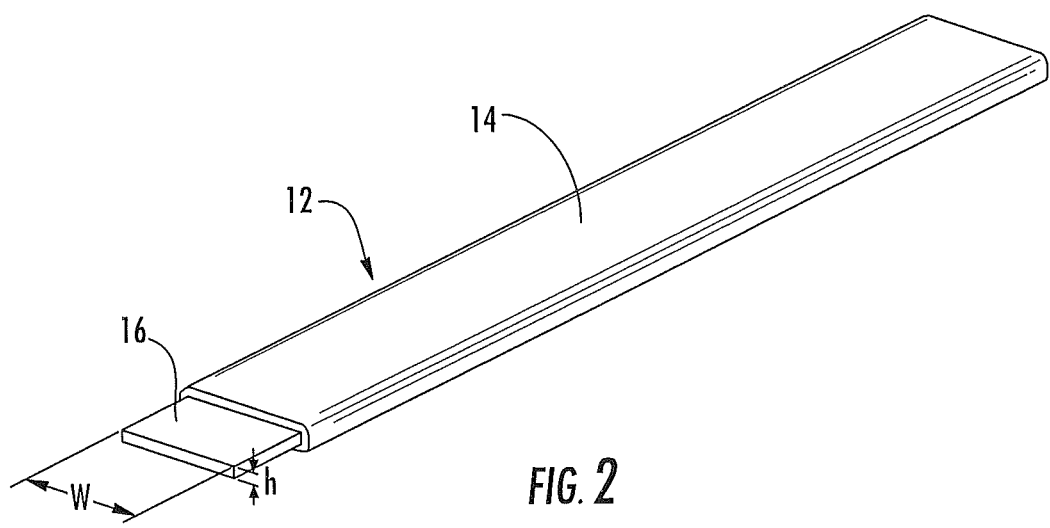
FIG. 2 is a perspective view of a flat power cable.
Figure 6:
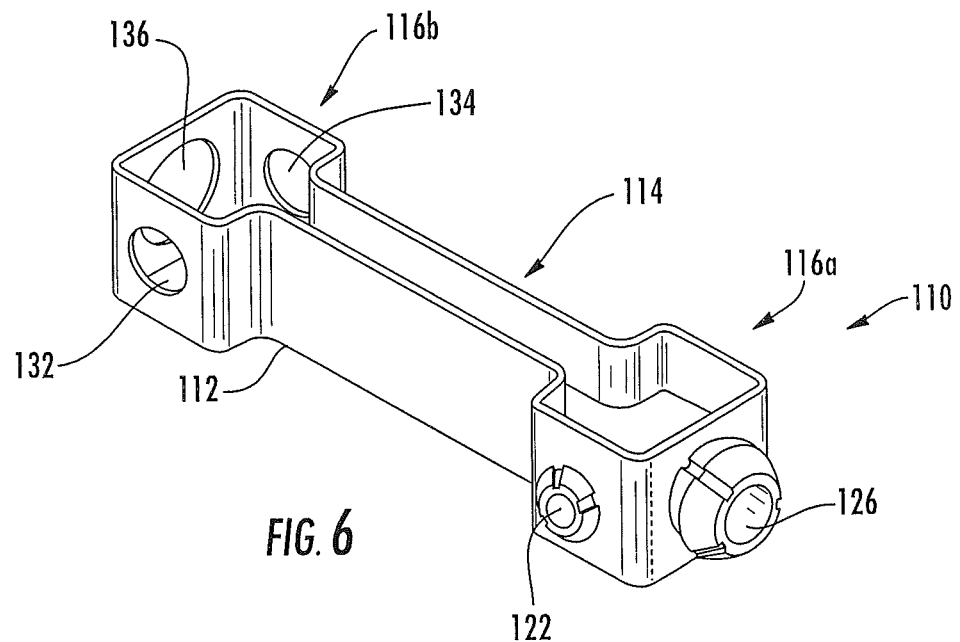
FIG. 6 is a front perspective view of a cable hanger according to additional embodiments of the present invention.
Figure 7:
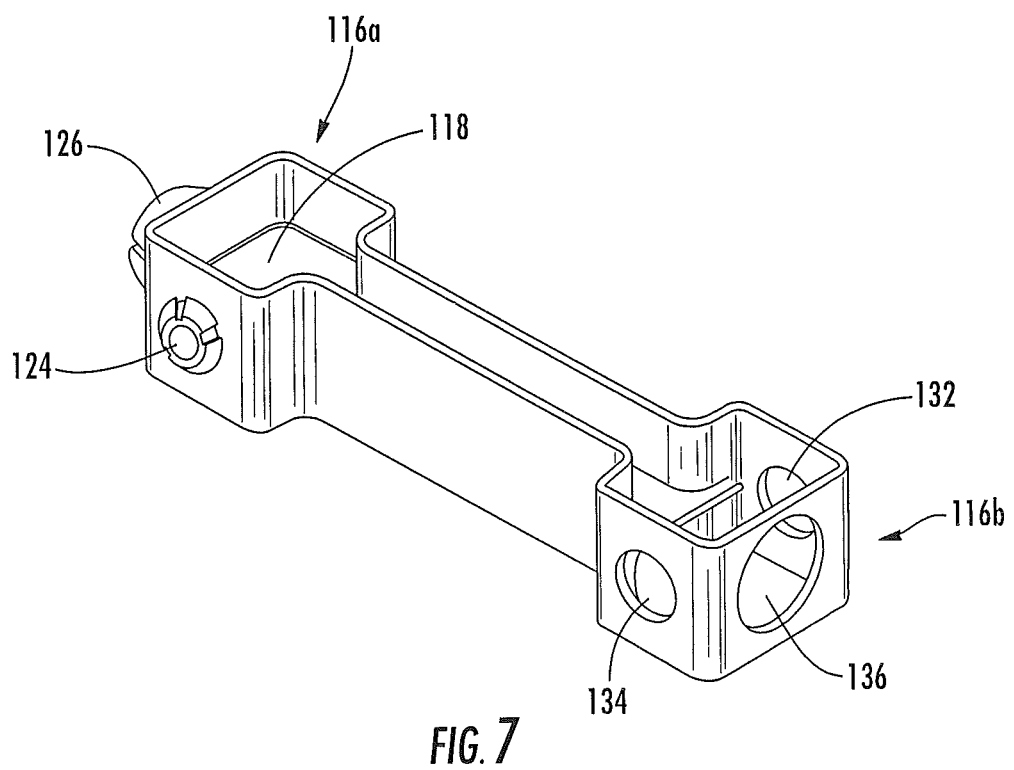
FIG. 7 is a rear perspective view of the cable hanger of FIG. 6.
Figure 8:
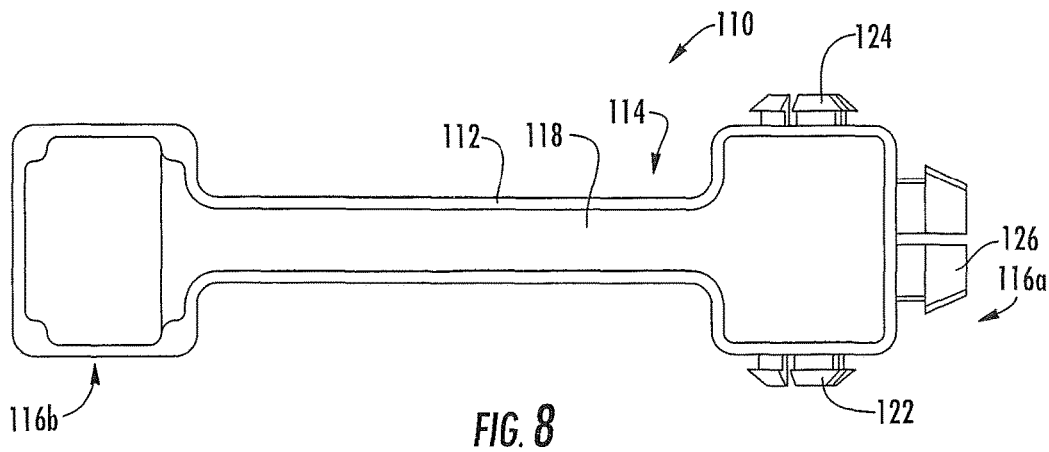
FIG. 8 is a top view of the cable hanger of FIG. 6.
Figure 9:
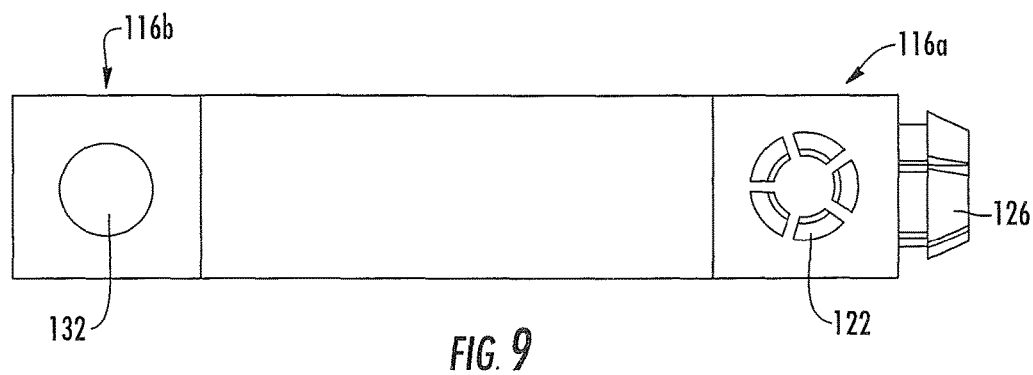
FIG. 9 is a bottom view of the cable hanger of FIG. 6.
Figure 10:
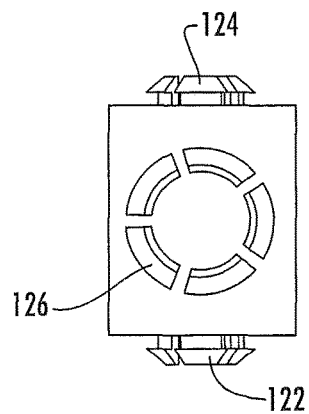
FIG. 10 is a right end view of the cable hanger of FIG. 6.
Figure 11:
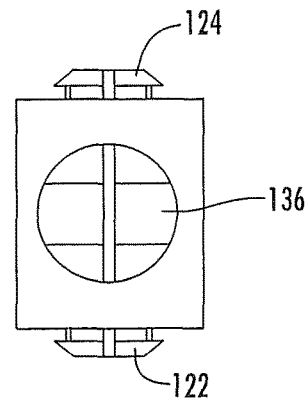
FIG. 11 is a left end view of the cable hanger of FIG. 6.

FIG. 2 illustrates a flat power cable 12. The cable 12 includes a jacket 14 and one or more conductors 16 that are arranged in a "flat" configuration, in which the aspect ratio of width w to height h is quite high (e.g., 2 to 1, 3 to 1, 4 to 1 or even greater). Exemplary flat cables 12 are discussed in co-pending and co-assigned U.S. patent application Ser. No. 13/561,115, the disclosure of which is hereby incorporated herein in its entirety.

Attachment of flat cables 12 to a foundation structure such as the antenna tower 5 can be achieved in multiple ways. Referring now to FIGS. 3-5, a mounting bracket 30 and an adapter 20 for attaching flat cables to a tower 5 are shown therein. Referring first to FIG. 3, the mounting bracket 30 is generally H-shaped, with a central section 32 and four arms 34a-d extending from the ends thereof. Each of the arms 34a-d includes an inwardly-facing barb 36. The arms 34a, 34b, corresponding barbs 36 and central section 32 define a first receiving compartment 40a, and the arms 34c, 34d, corresponding barbs 36, and central section 32 define a second receiving compartment 40b. The mounting bracket 30 can be formed of any material that has sufficient strength and rigidity to maintain a power cable in place; exemplary materials include metals (e.g., stainless steel) and polymeric materials (e.g., nylon, polypropylene and the like).

As shown in broken line in FIG. 3, the mounting bracket 30 is configured to receive and hold two power cables 12, with one cable 12 being positioned in the first receiving compartment 40a between the arms 34a, 34b, and the other cable 12 being positioned in the second receiving compartment 40b between the arms 34c, 34d. The mounting bracket 30 is sized such that the cables 12 fit snugly into the receiving compartments 40a, 40b between the arms 34a-d and are held tightly therein. Exemplary dimensions for the mounting bracket 30 include a width W between the arms 34a, 34b of between about 1 and 5 inches, a depth D between a barb 36 and the central section 32 of between about ⅜ and 4 inches, and a height H of between about ⅜ and 5 inches. In some embodiments, the cables 12 may include ridges, rib, grooves or the like in their external jackets that can engage the barbs 36 and/or the central section 32 to assist with securing of the cables 12.

Referring now to FIG. 4, the adapter 20 includes a main body 22, snaps 24 that extend from one surface of the main body 22, and a bolt 26 that extends from the main body 22 between the snaps 24. Either the snaps 24 or the bolt 26 can be used to attach the adapter 20 to the tower 5, depending on the configuration of the tower 5 (for example, if the cables 12 are to be mounted to a cable ladder 10 with a ¾ inch hole, the snaps 24 may be appropriate, whereas the bolt 26 may be more suitable for attachment if an angle adapter of the antenna tower 5 serves as the foundation structure). Fingers 28 extend from the main body 22 and are configured to receive a power cable 12, although receiving structure other than the fingers 28 may also be employed.

As shown in FIG. 5, in operation the adapter 20 is mounted onto the tower 5 via the snaps 24 and/or the bolt 26. A first flat power cable 12 is mounted between the fingers 28. A second flat cable 12 can be mounted by first securing a mounting bracket 30 to the first power cable 12 (for example, by snapping the first power cable 12 into the first receiving compartment 40a between the arms 34a, 34b) so that the mounting bracket 30 is supported from underneath by the adapter 20, then securing the second power cable 12 to the mounting bracket 30 by snapping the second power cable 12 into the receiving compartment 40b between the arms 34c, 34d. This process can be repeated with subsequent power cables 12 and mounting brackets 30 (as an example, three mounting brackets 30 are shown in FIG. 5) in a stacked, staggered arrangement of mounting brackets 30 to form an assembly 70. Thus, any number of flat power cables 12 can be secured to the antenna tower 5 quickly and easily.

Those skilled in this art will appreciate that other configurations of the mounting bracket 30 may be suitable. For example, the mounting bracket 30 may be configured to receive two or more flat power cables 12 within a single pair of the arms 34a-d, particularly if it is anticipated that a large number of flat power cables 12 are to be secured. Also, the shapes of the barbs 36 or any securing protrusion may vary. Further, the mounting bracket 30 may be employed to secure cables of other cross-sectional shapes; for example, cables that are round, oval, rectangular, square, or the like may be secured with a mounting bracket 30 that has arms 34 of corresponding shape. Moreover, in some embodiments the mounting bracket 30 may be employed to secure other types of cable, or even other elongate members or components; exemplary alternative cables include fiber optic cables, twisted pair cables, coaxial cables, and cables that are hybrids of these different types.

It will also be appreciated that, although the ladder 10 shown herein represents one or more structures or components of an antenna tower, other structures, such as water towers, may also serve as a foundation structure for the adapter 20 and mounting bracket 30 to mount multiple elongate members or components in a stacked, staggered arrangement.

Referring now to FIGS. 6-11, another embodiment of a cable hanger, designated broadly at 110, is shown therein. The cable hanger 110 includes an outer wall 112 that takes a "dumbbell" or "dog bone" shape, with a narrower center portion 114 and wider end portions 116a, 116b. A panel 118 spans the central portion 114 and one of the end portions 116a, with the other end 116b remaining predominantly open.

The end portion 116a includes a split boss latch 122 on its front face and a second split boss latch 124 on its opposed rear face. A third split boss latch 126 extends outwardly from the end face of the end portion 116a. In the illustrated embodiment, the split boss latches 122, 124 are similar in size and configuration, whereas the split boss latch 126 is larger; however, in other embodiments all of the split boss latches may be of the same size.

The end portion 116b includes latch-receiving apertures 132, 134 in its front and rear faces. The latch-receiving apertures 132, 134 are sized to receive split boss latches 122, 124. The end portion 116b also includes a latch-receiving aperture 136 in its end face that is sized to receive the split boss latch 126.

In the illustrated embodiment, the cable hanger 110 is formed as a unitary member. The cable hanger 110 may be formed of a polymeric material, such as glass reinforced polypropylene, nylon or acetal. If formed of a polymeric material, the cable hanger 110 may be injection-molded.

Figure 12:
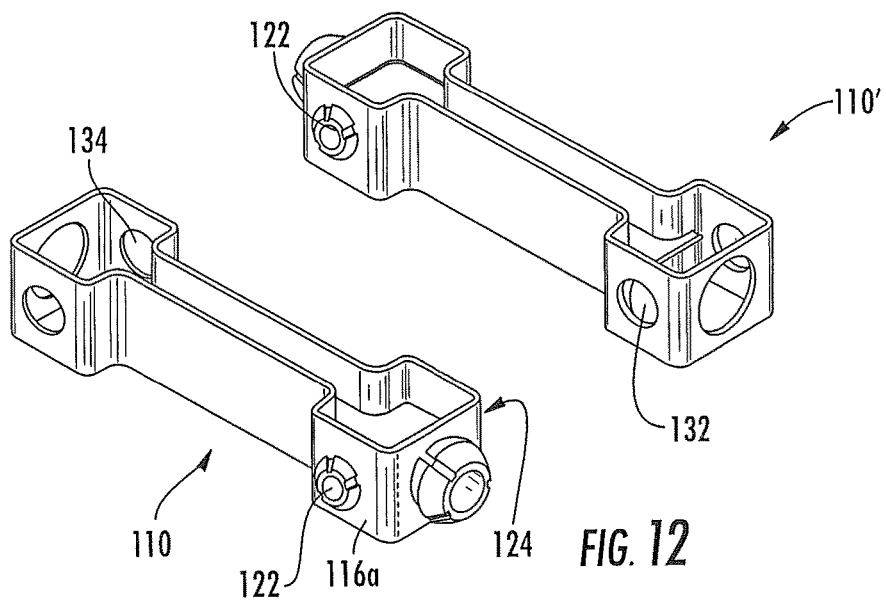
FIG. 12 is an exploded perspective view of two cable hangers of FIG. 6 showing how the cable hangers are oriented for assembly.
Figure 13:
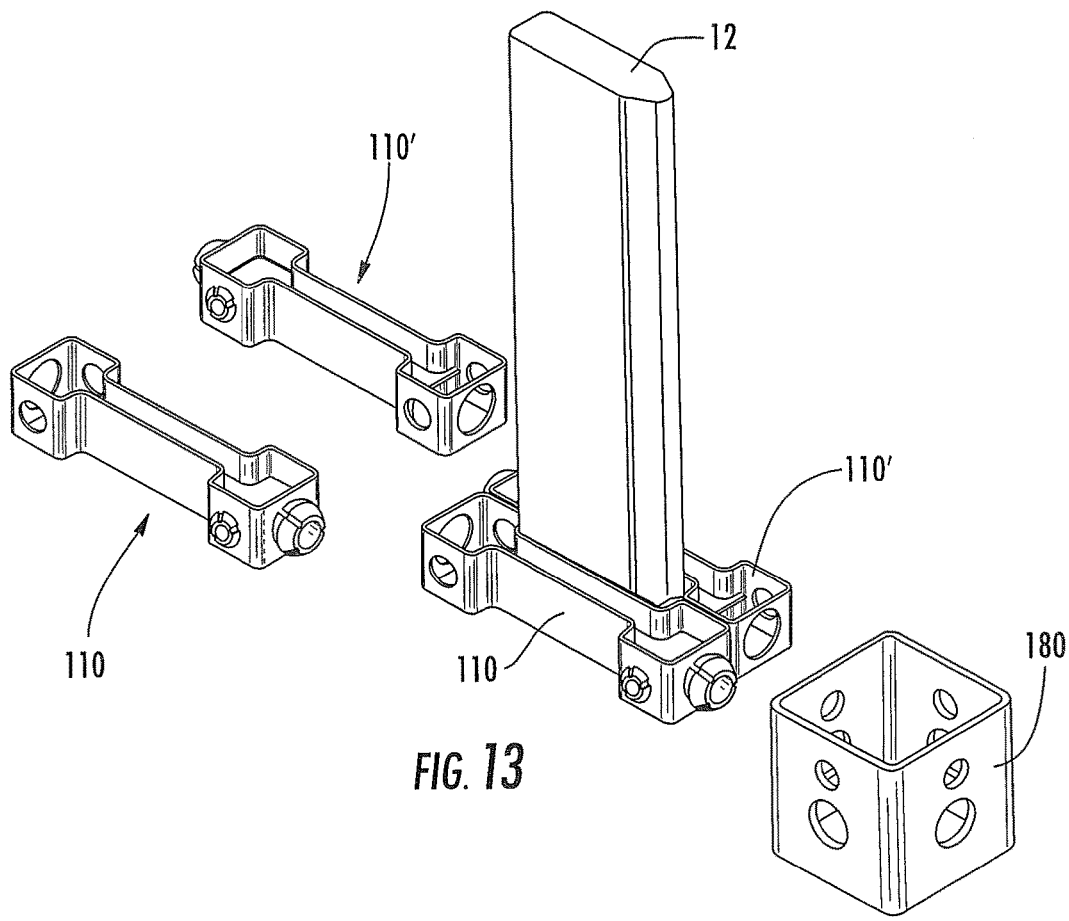
FIG. 13 is a perspective view of the cable hangers of FIG. 6 capturing a flat power cable and an adapter for mounting one of the cable hangers to an antenna tower.

As can be seen in FIG. 12, two cable hangers 110, 110' can be attached to each other by re-orienting the cable hanger 110' so that its end portion 116b aligns with the end portion 116a of the cable hanger 110. In this position, the split boss latch 124 of the cable hanger 110 can be inserted into the latch-receiving aperture 132 of the cable hanger 110', and the split boss latch 122 of the cable hanger 110' can be inserted into the latch-receiving aperture 134 of the cable hanger 110. Assembly of two cable hangers 110, 110' creates a space between the central portions 114 of the cable hangers 110, 110' in which a flat cable 12 such as those described above can be captured (see FIG. 13).

It will also be apparent that any number of flat cables 12 can be assembled in a "stacked" configuration. By simply orienting another cable hanger 110 in the orientation of the cable hanger 110' in FIG. 13, inserting its split boss latch 124 into the latch-receiving aperture 132 of the existing cable hanger 110, and inserting the split boss latch 124 of the existing cable hanger 110 into the latch-receiving aperture 132 of the next cable hanger 110, another flat cable 12 can be captured in a stacked relationship. Additional flat cables 12 can be attached in the same manner, with the next cable hanger 110 being reoriented each time.

A stack of flat cables 12 may be secured to a foundation structure, such as a ladder 10 or angle adapter of an antenna tower 5 such as that shown in FIG. 1. In some embodiments, the foundation structure may have apertures that can receive one of the split boss latches 122, 124 of the cable hanger 110; in other embodiments, the stack of flat cables 12 may be mounted via an adapter 180 (see FIG. 13), which can in turn be mounted to the foundation structure. It can be seen that the adapter 180 of FIG. 13 could be mounted to the ladder 10 of FIG. 1 via screws or bolts inserted into the holes of the ladder 10 and the adapter 180 (this can be envisioned by examination of FIG. 13).

It should also be apparent that the cable hangers 110 can be employed to secure flat cables 12 in an endwise fashion. This arrangement can be achieved by securing two flat cables 12 within pairs of cable hangers 110 as described above, positioning the assembled cables/hangers endwise, then inserting the split boss latches 126 of the cable hangers 110 into the facing apertures 136. As with the stacked arrangement described above, any number of flat cables 12 can be arranged in this endwise manner.

Those skilled in this art will recognize that the stacked and endwise arrangements of flat cables 12 described above may be combined, thereby creating a "grid" of flat cables 12.

Notably, the stacked, endwise, and grid arrangements can all be achieved with a single configuration of cable hanger; it is not necessary to have "right-" and "left-handed" hangers, or to use a different type of hanger for the stacked and endwise arrangements. The universality of the cable hanger 12 can simplify the process of cable securing significantly.

Those skilled in this art will recognize that the cable hanger 110 may take other forms. For example, the central portion of the cable hanger may take a different shape if a cable of a different cross-sectional profile (e.g., round) is to be captured with the hangers. Moreover, in some embodiments the cable hangers may be employed to secure other types of cable, or even other elongate members or components; exemplary alternative cables include fiber optic cables, twisted pair cables, coaxial cables, and cables that are hybrids of these different types.

Also, the split boss latches and accompanying apertures may take another form: they may be oval, square, rectangular, etc., Also, another type of securing mechanism or system that has mounting features that can mate when the two cable hangers are brought together (e.g., different types of snaps, latches, pins, posts and the like) may be employed.

Figure 14:
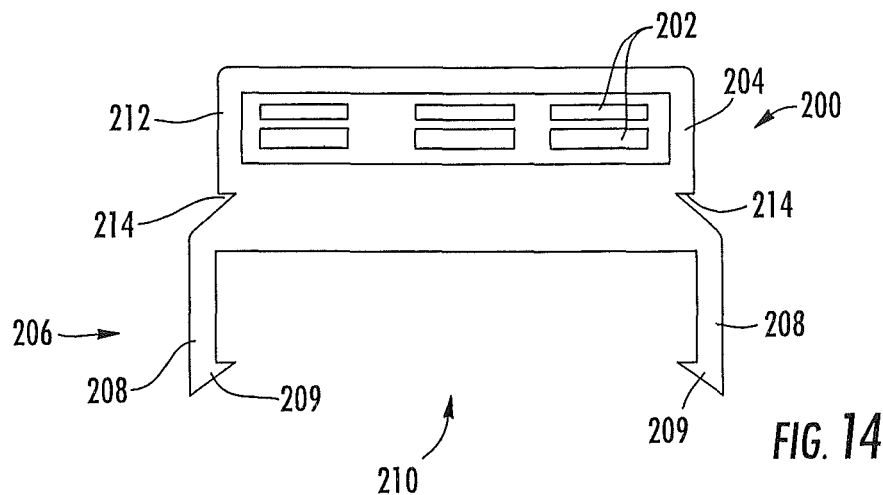
FIG. 14 is a section view of a flat power cable with a jacket configured to receive another flat power cable for mounting according to further embodiments of the present invention.

Another technique for mounting cables to a foundation structure is illustrated in FIGS. 14-21. Referring first to FIG. 14, a flat power cable, designated broadly at 200, is illustrated therein. The flat power cable 200 includes six power conductors 202 within a jacket 204. The configuration of the conductors 202 may be as discussed above and in U.S. patent application Ser. No. 13/561,115, supra.

The jacket 204 includes a main body 212 and mounting features 206 that comprise two arms 208 with barbs 209 that form a receiving recess 210. The jacket 204 of the cable 200 may be formed of any material typically known to be suitable for protecting the inner components of a power cable. Exemplary materials include PVC and polyethylene. The jacket 204 may be formed in any manner known to those of skill in this art for forming an elongate jacket, and in some embodiments, the jacket 204 may be formed via extrusion process. In some embodiments, the mounting features 206 may be continuous over the length of the cable 200, while in other embodiments, the mounting features 206 may be discontinuous and/or intermittent along the length of the cable 200.

Figure 15:
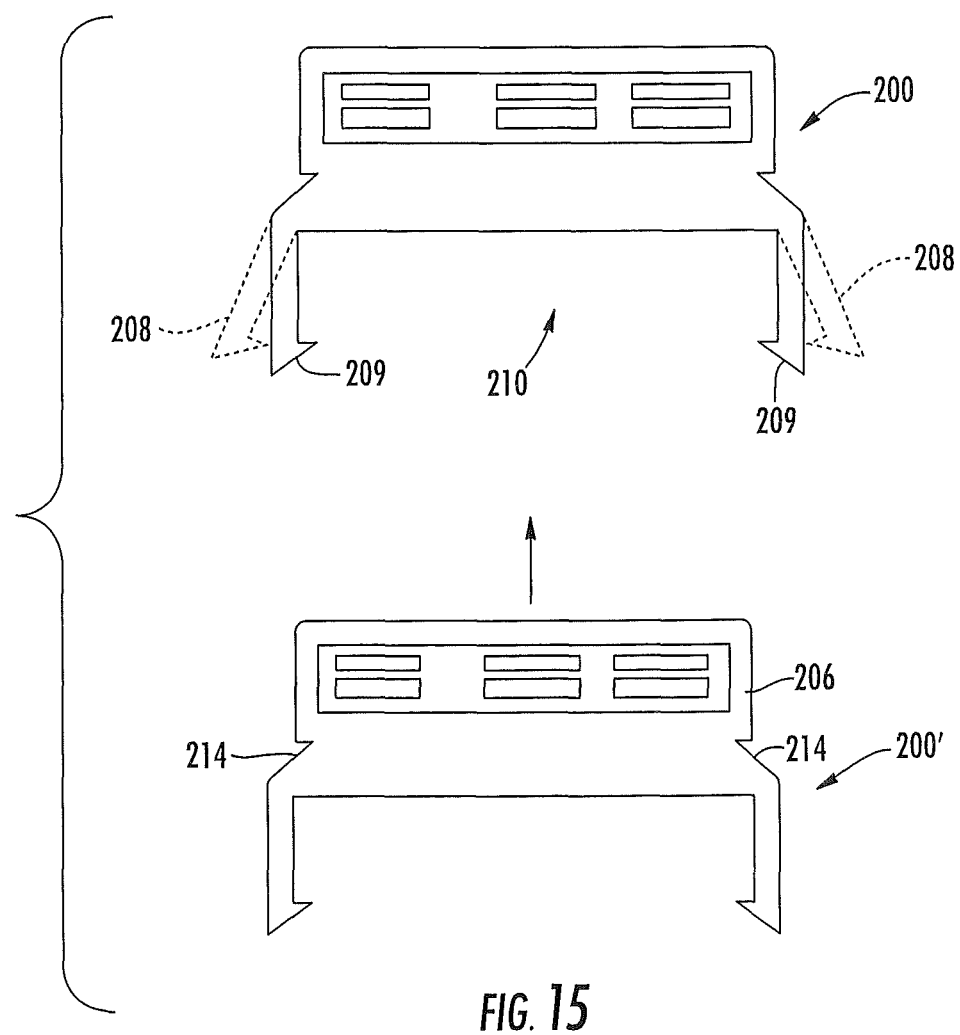
FIG. 15 is an exploded section view of two cables of FIG. 14 illustrating how the cables can be mounted in stacked fashion.

As is shown in FIG. 15, the flat power cable 200 can be mounted in stacked fashion to a second flat power cable 200' by inserting the main body 206 of the second cable 200' into the receiving recess 210 of the first cable 200. As the main body 206 of the second cable 200' is forced into the barbs 209 of the first cable 200, the arms 208 deflect, thereby permitting the main body 206 of the second cable 200' to enter the receiving recess 210 of the first cable 200. When the arms 208 recover after deflection, the barbs 209 of the first cable 200 fit within notches 214 on the sides of the jacket 204 of the second cable 200' to create a stack of mounted cables. It can be understood that any number of cables 200 can be added to create a stack of cables mounted to and extending away from a foundation structure (such as the aforementioned tower 5 or ladder 10) via the mounting of a single cable to the foundation structure.

Figure 16:
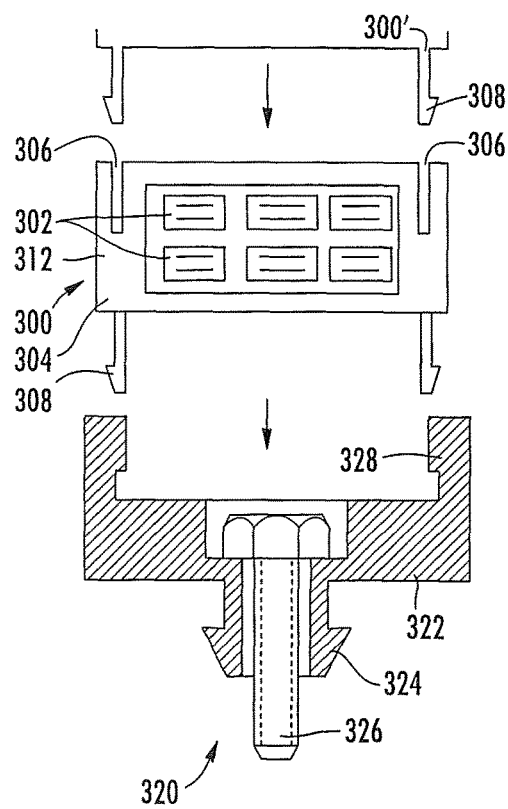
FIG. 16 is an exploded section view of a flat power cable and a mounting adapter according to still further embodiments of the invention.

Referring now to FIG. 16, another embodiment of a flat power cable, designated broadly at 300, is shown therein. The cable 300 includes six conductors 302 within a jacket 304. The jacket 304 includes a generally rectangular main body 312 with slots 306 in one surface thereof and fingers 308 extending from an opposed surface thereof. It can be seen in FIG. 16 that a second cable 300' can be mounted onto the first cable 300 by inserting the fingers 308 of the second cable 300' into the slots 306 of the first cable 300.

FIG. 16 also shows an adapter 320 that can be used to mount the first cable 300 to a foundation structure (such as the aforementioned antenna tower 5 or ladder 10). The adapter 320 includes a main body 322, snaps 324 that extend from one surface of the main body 322, and a bolt 326 that extends from the main body 322 between the snaps 324. Either the snaps 324 or the bolt 326 can be used to attach the adapter 320 to the foundation structure, depending on the configuration thereof (for example, if the foundation structure comprises a ladder 10 with a ¾ inch hole, the snaps 324 may be appropriate, whereas the bolt 326 may be more suitable for attachment if an angle adapter of an antenna tower 5 serves as the foundation). Fingers 328 extend from the main body 322 and are configured to receive the fingers 308 of the first cable 300, although receiving structure other than the fingers 328 may also be employed.

Figure 17:
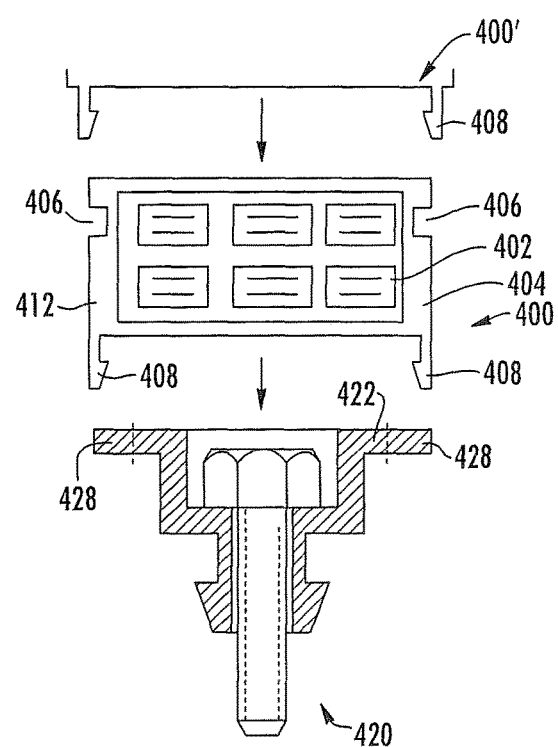
FIG. 17 is an exploded section view of a flat power cable and a mounting adapter according to yet further embodiments of the invention.

FIG. 17 illustrates another variation of a flat power cable, designated broadly at 400. Like the cable 300, the cable 400 includes six conductors 402 within a jacket 404, but the jacket 404 has two notches 406 in its side walls. Two fingers 408 extend from one surface of the main body 412 of the jacket 404. A second cable 400' can be mounted to a first cable 400 by inserting the fingers 408 of the second cable 400' into the notches 406 of the first cable 400. An adapter 420 includes a main body 422 with wings 428 that are received by the fingers 408 of the first cable 400.

As with the cables 200, the jackets 304, 404 of the cables 300, 400 may be formed of any material typically known to be suitable for protecting the inner components of a power cable, with exemplary materials including PVC and polyethylene. The jackets 304, 404 may be formed in any manner known to those of skill in this art for forming an elongate jacket, including extrusion, and in some embodiments, the mounting features (i.e., the slots 306 and fingers 308 of the cable 300 and the notches 406 and fingers 408 of the cable 400) may be continuous or discontinuous/intermittent over the length of the cables 300, 400.

Figure 18:
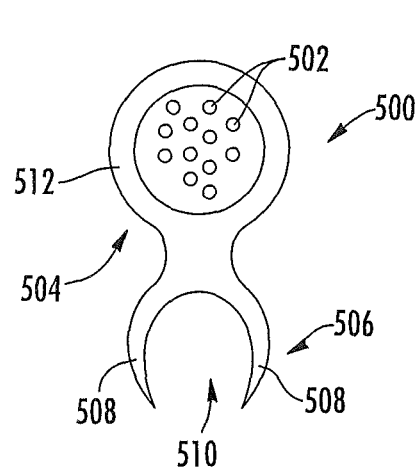
FIG. 18 is a section view of a fiber optic cable with a jacket configured to receive another fiber optic cable for mounting according to still further embodiments of the present invention.

As a further alternative, a fiber optic cable, designated broadly at 500, is illustrated in FIG. 18. The fiber optic cable 500 includes a plurality of optical fibers 502 surrounded by a unitary jacket 504. The optical fibers 502 can be of conventional construction and need not be described in detail herein. Also, the optical fibers 502 may be surrounded by additional layers and components, such as strength members, buffer tubes, and the like, which are not illustrated herein but are known to those of skill in this art.

Figure 19:
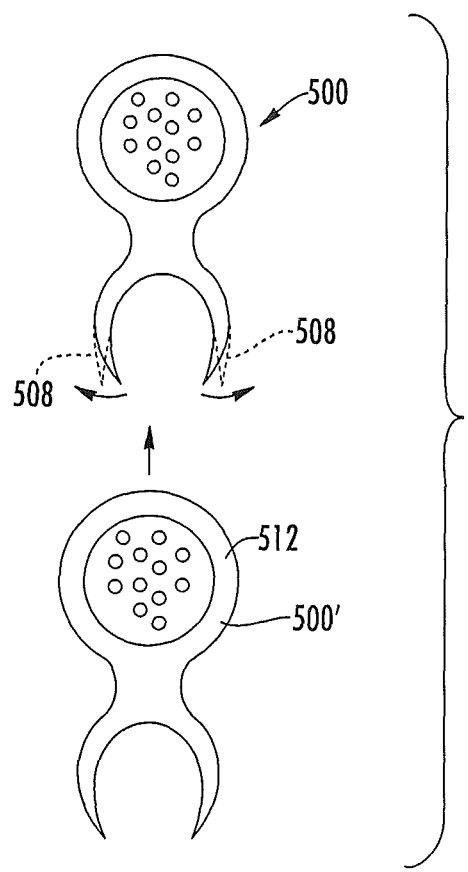
FIG. 19 is an exploded section view of two cables of FIG. 18 illustrating how the cables can be mounted in stacked fashion.

The jacket 504 surrounds the optical fibers 502 and any intervening layers. The jacket 504 includes a main body 512 that surrounds the optical fibers 502 and mounting features 506 (which in the illustrated embodiment are in the form of arms 508) extending from the main body 512 that form a receiving recess 510. As can be seen in FIG. 19, a second fiber optic cable 500' can be mounted to the fiber optic cable 500 by pushing the second fiber optic cable 500 into the arms 508, thereby causing them to deflect outwardly (shown in broken line in FIG. 19). The main body 512 of the second cable 500' is received in the receiving recess 510 of the first cable 500, with the arms 508 of the first cable 500 capturing the main body 512 of the second cable 500', which mounts the cables 500, 500' together in a stacked fashion.

As discussed above with respect to the cables 200, 300, 400, the jacket 504 may be formed of any material typically known to be suitable for protecting the inner components of a fiber optic cable. Exemplary materials include PVC and polyethylene. The jacket 504 may be formed in any manner known to those of skill in this art for forming an elongate unitary jacket; in some embodiments, the jacket 504 may be formed by an extrusion process that forms the main body 512 over the optical fibers 502 and the mounting features 506 at the same time. In some embodiments, the mounting features 506 may be continuous over the length of the cable 500; in other embodiments, the mounting features 506 may be discontinuous and/or intermittent along the length of the cable 500, a configuration that would require less material for the jacket 504.

Figure 20:
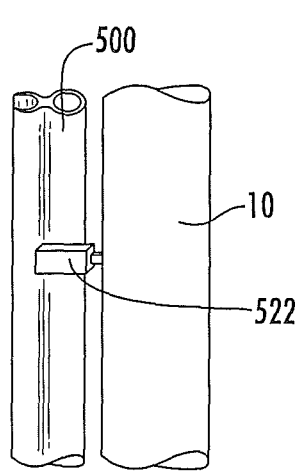
FIG. 20 is a side view of a cable of FIG. 18 mounted to a foundation structure with an adapter.
Figure 21:
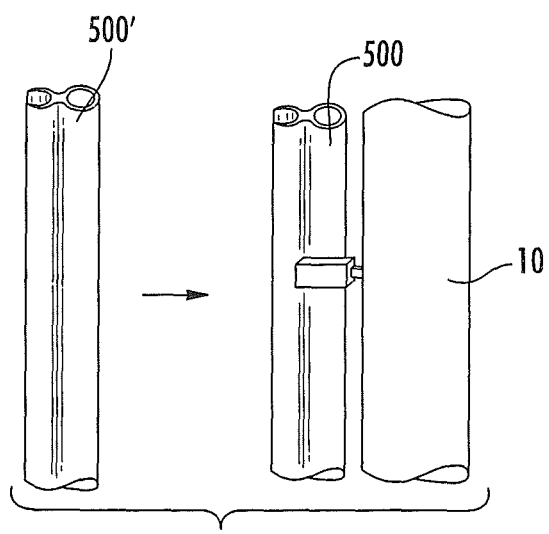
FIG. 21 is an exploded side view of the cable of FIG. 20 receiving another cable of FIG. 18 for mounting.

The stacked arrangement of cables 500 is illustrated again in FIGS. 20 and 21. A foundation structure, such as the ladder 10 of an antenna tower, receives a clamp 522 that secures a first cable 500 (FIG. 20). The second cable 500' can then be mounted to the first cable 500 as described above (FIG. 21). It can be understood that any number of cables 500 can be added to create a stack of cables mounted to and extending away from the foundation structure 10 via the mounting of a single cable to the foundation structure.

Those skilled in this art will appreciate that, although the flat power cables 200, 300, 400 and the fiber optic cable 500 are illustrated and described herein, any cable having a jacket that surrounds a core of internal components may be suitable for application of this concept. For example, a communications cable having electrical conductors in its core (rather than power conductors or optical fibers) may also benefit from a jacket configured as described above; exemplary alternative cables include twisted pair cables, coaxial cables, and cables that are hybrids of these different types.

Figure 22:
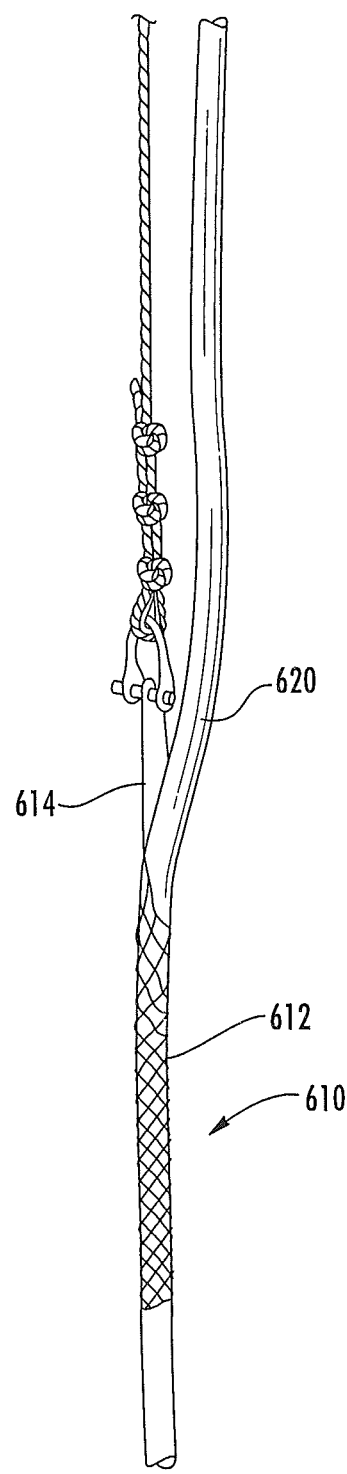
FIG. 22 is a side view of a hoisting grip and cable according to the prior art.

Cables of the types discussed above must be raised onto antenna towers for mounting. Often, raising of cables is achieved with a device known as a hoisting grip. An assembly comprising a hoisting grip and a traditional round power cable secured therein is illustrated in FIG. 22. The hoisting grip, designated broadly at 610, comprises a mesh 612 and an upper loop 614. The hoisting grip 610 is configured similarly to a Chinese finger trap or toy, which comprises a cylindrical sleeve that, when subjected to an axial force, such as a pulling or tugging on one end, decreases in diameter, thereby squeezing an object within the sleeve. Thus, the application of tension to the upper loop 614 of the hoisting grip 610 causes the mesh 612 to squeeze the round cable 620 residing therein. Hoisting grips of this configuration are well-known in this art and need not be described in detail herein; an exemplary hoisting grip is described in Bulletin 17262G, Revision K, available from CommScope, Inc. (Hickory, N.C.).

Figure 23:
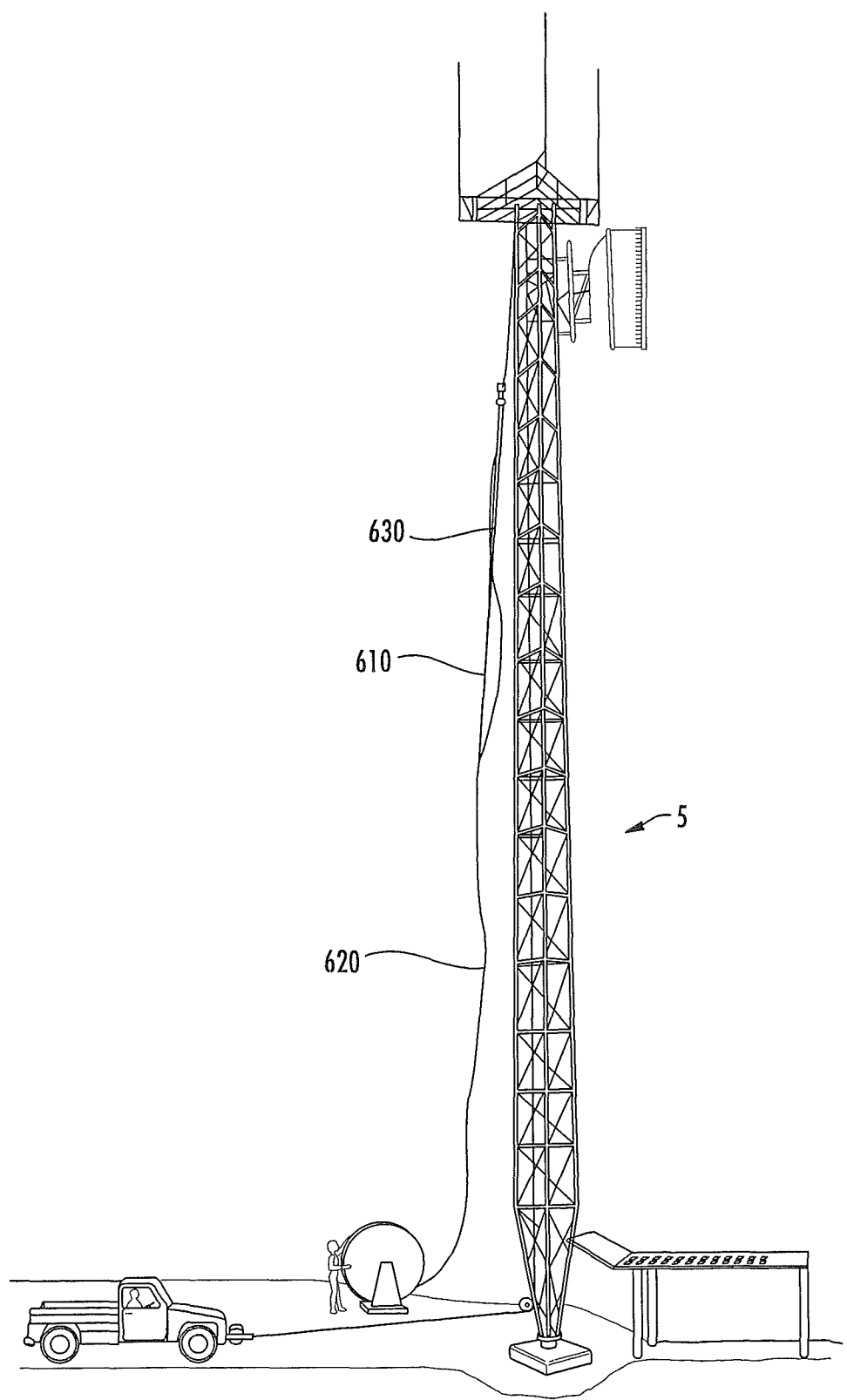
FIG. 23 is a side view of a tower to which a hoisting grip and cable of FIG. 22 may be attached.
Figure 25:
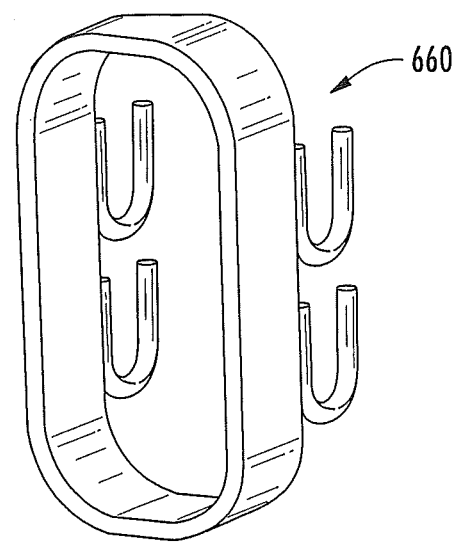
FIG. 25 is a perspective view of a hanger that may be used to attach a hoisting grip and cable secured therein to a tower as in FIG. 23.

As shown in FIG. 23, the hoisting grip 610 can be used to lift and mount a cable 620 to a vertical tower, such as the antenna tower 5. Multiple hoisting grips 610 (only one of which is shown in FIG. 2) can be secured to the cable 620 and to a rope 630. The rope 630 is routed over a pulley mounted near the top of the antenna tower 5 and used to hoist the cable 620 up the tower 5. Once the cable 620 is in position, the hoisting grips 610 can be secured to the tower 5 to mount the cable 620 thereto. FIG. 25 illustrates an exemplary hanger 660 used to mount the hoisting grips 610 to the tower 5.

Figure 24:
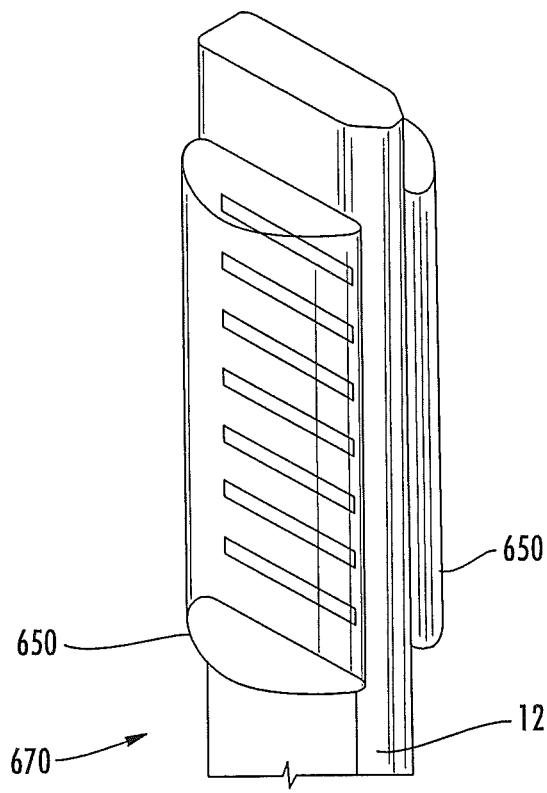
FIG. 24 is an enlarged view of a flat power cable with spacer attached to an end thereof according to embodiments of the present invention.

FIG. 24 illustrates a generally flat (rather than round) power cable 12. The flat profile of the cable 12 would, by itself, likely render the cable 12 inappropriate for securing to a tower with a hoisting grip 610. However, attached to the flat cable 12 are two generally semicylindrical spacers 650 to form a power cable assembly 670. The spacers 650 are mounted to opposite sides of the flat cable 12 to form a generally cylindrical profile. As such, the flat cable 12 with the spacers 650 in place is appropriately shaped for securing with a conventional hoisting grip 610 such as that described above.

The spacers 650 may be formed of any material sufficiently rigid to maintain its shape when squeezed with a hoisting grip 610. Exemplary materials include polymeric materials such as EPDM rubber. The spacers 650 may be fixed to the cable 12 via any number of fastening methods, such as adhesives, threaded fasteners, and the like, or may simply rest against the flat surfaces of the cable 12 and be held in place by the squeezing action of the hoisting grip 610.

In one embodiment, the spacers 650 are between about 5 and 12 inches in length. In other embodiments, the power cable assembly 670 (comprising the cable 12 and the spacers 650) has a diameter of between about 2 and 4 inches.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An assembly, comprising:
a foundation structure;
first and second cables having a flattened profile; and
a mounting member engaging the first and second cables such that the first and second cables are arranged in stacked relationship and are mounted to the foundation structure, wherein the mounting member comprises:
a relatively narrow central portion; and
first and second end portions mounted on respective opposed ends of the central portion;
each of the first and second end portions including front and rear opposed faces;
wherein each of the front face of the first end portion and the rear face of the first end portion has a first mounting feature, and wherein the rear face of the second end portion and the front face of the second end portion has a second mounting feature configured to mate with the first mounting feature.

2. The assembly defined in claim 1, wherein the first end portion has an end face with a third mounting feature, and the second end portion has an end face with a fourth mounting feature configured to mate with the third mounting feature.

3. The assembly defined in claim 1, wherein the first mounting feature is a split boss latch, and the second mounting feature is a latch-receiving aperture.

4. The assembly defined in claim 2, wherein the third mounting feature is a split boss latch, and the fourth mounting feature is a latch-receiving aperture.

5. The assembly defined in claim 1, wherein the mounting member is formed as a unitary member.

6. The assembly defined in claim 1, wherein the mounting member comprises a first mounting member, and further comprising a second mounting member identical to the first mounting member;
wherein the first mounting member is attached to the second mounting member, with one of the first mounting feature of the first mounting member mating with one of the second mounting features of the second mounting member, and with one of the second mounting features of the first mounting member mating with one of the first mounting features of the second mounting member;
and wherein the first cable is captured between the first and second mounting members.

7. The assembly defined in claim 1, wherein the first and second cables are power cables.

8. The assembly defined in claim 1, wherein the foundation structure is an antenna tower or a component thereof.

9. An assembly, comprising:
a foundation structure comprising an antenna tower or a component thereof;
first and second power cables having a flattened profile; and
a mounting member engaging the first and second cables such that the first and second cables are arranged in stacked relationship and are mounted to the foundation structure, wherein the mounting member comprises:
a relatively narrow central portion; and
first and second end portions mounted on respective opposed ends of the central portion;
each of the first and second end portions including front and rear opposed faces;
wherein each of the front face of the first end portion and the rear face of the first end portion has a first mounting feature, and wherein the rear face of the second end portion and the front face of the second end portion has a second mounting feature configured to mate with the first mounting feature.

10. The assembly defined in claim 9, wherein the first end portion has an end face with a third mounting feature, and the second end portion has an end face with a fourth mounting feature configured to mate with the third mounting feature.

11. The assembly defined in claim 9, wherein the first mounting feature is a split boss latch, and the second mounting feature is a latch-receiving aperture.

12. The assembly defined in claim 10, wherein the third mounting feature is a split boss latch, and the fourth mounting feature is a latch-receiving aperture.

13. The assembly defined in claim 9, wherein the mounting member is formed as a unitary member.

14. The assembly defined in claim 9, wherein the mounting member comprises a first mounting member, and further comprising a second mounting member identical to the first mounting member;

wherein the first mounting member is attached to the second mounting member, with one of the first mounting feature of the first mounting member mating with one of the second mounting features of the second mounting member, and with one of the second mounting features of the first mounting member mating with one of the first mounting features of the second mounting member;

and wherein the first cable is captured between the first and second mounting members.

* * * * *